(12) United States Patent
King, Jr. et al.

(10) Patent No.: US 7,431,611 B2
(45) Date of Patent: Oct. 7, 2008

(54) WIRE CONNECTOR

(75) Inventors: Lloyd Herbert King, Jr., Chesterfield, MO (US); William Hiner, O'Fallon, MO (US); James C. Keeven, O'Fallon, MO (US); Bradley L. Driskell, Troy, MO (US)

(73) Assignee: The Patent Store, LLC, O'Fallon, MO (US)

( * ) Notice: Subject to any disclaimer, the term of this patent is extended or adjusted under 35 U.S.C. 154(b) by 19 days.

(21) Appl. No.: 11/716,522

(22) Filed: Mar. 9, 2007

(65) Prior Publication Data

US 2008/0105452 A1    May 8, 2008

Related U.S. Application Data

(63) Continuation-in-part of application No. 11/593,827, filed on Nov. 7, 2006, now Pat. No. 7,384,297.

(51) Int. Cl.
*H01R 13/52* (2006.01)
(52) U.S. Cl. ............................. 439/521; 439/369
(58) Field of Classification Search ............ 439/369, 439/370, 521
See application file for complete search history.

(56) References Cited

U.S. PATENT DOCUMENTS

| | | | | |
|---|---|---|---|---|
| 2,670,870 A | * | 3/1954 | Erich | 220/3.94 |
| 2,740,001 A | * | 3/1956 | Vergilio et al. | 174/138 F |
| 4,415,044 A | * | 11/1983 | Davis | 174/138 F |
| 4,600,261 A | * | 7/1986 | Debbaut | 439/521 |
| 5,023,402 A | * | 6/1991 | King et al. | 174/87 |
| 5,113,037 A | * | 5/1992 | King et al. | 174/87 |
| 5,151,239 A | * | 9/1992 | King, Jr. | 264/272.11 |
| 5,347,084 A | * | 9/1994 | Roney et al. | 174/92 |
| 5,828,005 A | * | 10/1998 | Huynh-Ba et al. | 174/92 |
| 5,913,692 A | * | 6/1999 | Targett | 439/369 |
| 6,025,559 A | * | 2/2000 | Simmons | 174/87 |
| 6,051,791 A | * | 4/2000 | King | 174/87 |
| 6,475,029 B2 | * | 11/2002 | Tucker et al. | 439/521 |
| 6,958,116 B1 | * | 10/2005 | Bennett | 205/734 |

* cited by examiner

*Primary Examiner*—Khiem Nguyen
(74) *Attorney, Agent, or Firm*—Jacobson & Johnson

(57) ABSTRACT

A see-through electrical connector comprises a first housing having a chamber therein, a second housing having chamber therein with the second housing including an open end mateable with an open end of the first housing to form an enclosure for supporting an electrical wire connection therein, a window located on either the first housing or the second housing for viewing the electrical wire connection in the enclosure, and an electrical wire securing and supporting member located in the enclosure.

16 Claims, 5 Drawing Sheets

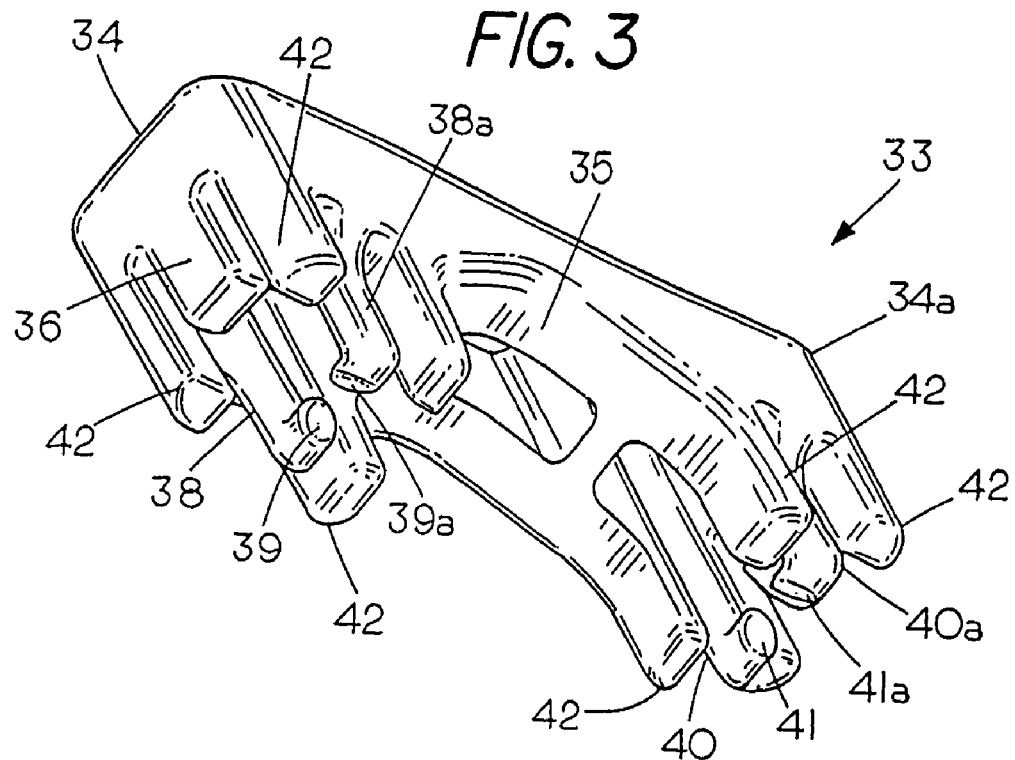
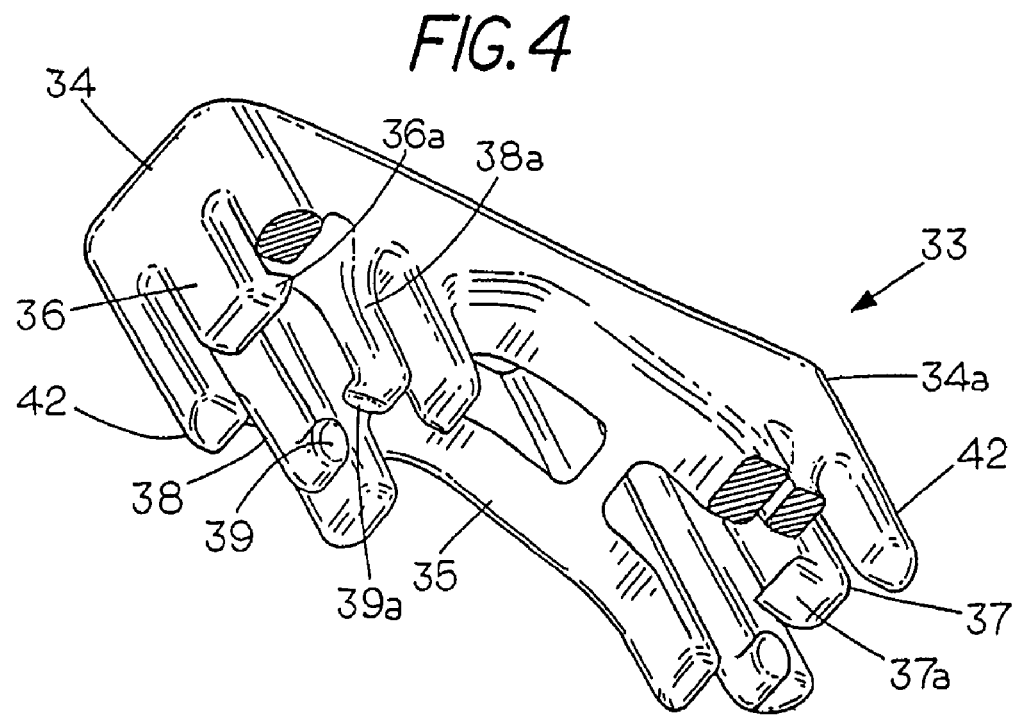

WIRE CONNECTOR

CROSS REFERENCE TO RELATED APPLICATIONS

This application is a continuation-in-part application of U.S. patent application Ser. No. 11/593,827; filed on Nov. 7, 2006 now U.S. Pat. No. 7,384,297; titled WIRE CONNECTOR.

FIELD OF THE INVENTION

This invention relates generally to wire connectors and, more specifically, to an open-face wire connector for on-the-go formation of a covered electrical junction.

STATEMENT REGARDING FEDERALLY SPONSORED RESEARCH OR DEVELOPMENT

None

REFERENCE TO A MICROFICHE APPENDIX

None

BACKGROUND OF THE INVENTION

One of the ways of formation of on-the-go sealant covered electrical connection in twist on wire connectors is disclosed in King U.S. Pat. Nos. 5,151,239; 5,113,037; 5,023,402 and Re 37,340 which show a twist on wire connector that allows on-the-go formation of a sealant covered electrical connection in the presence of a sealant.

The twist-on type of wire connector is well suited for joining two or more wires into an electrical connection with each other. Other applications such as the formation of connection to branch lines or the formation of electrical connections to other types of lugs generally require that the connection be made to the wire connector lug and the sealant is then poured or injected into the housing to encapsulate the electrical connections therein.

The Simmons U.S. Pat. No. 6,025,559 discloses a tubular housing having a twist-on wire connector where the wires are twisted into a coil and the wires and the wire holder are forced into a sealant located at the end of the tubular housing.

Still another embodiment of a tubular is shown in King U.S. Pat. No. 6,051,791 wherein a two-part connector containing a connector is made in a shoe and the shoe with the electrical connector is forced into a tubular member containing a sealant.

SUMMARY OF THE INVENTION

An open-face electrical connector comprising a first housing having a chamber therein and a second housing mateable with the first housing to form an enclosure for supporting an electrical wire therein with at least one latchable wire retainer therein having jaw that can be clamped around an electrical wire to hold the electrical wire therein.

The present invention also comprises a see-through electrical connector that includes a first housing having a chamber therein and a second housing having chamber therein. The second housing includes an open end mateable with an open end of the first housing to form an enclosure for supporting an electrical wire connection therein. Located in the enclosure is an electrical wire securing and supporting member for supporting an electrical wire connection. Located on the first housing, the second housing, or the first housing and the second housing is a window for viewing the electrical wire connection in the enclosure. Also located on either the first housing, the second housing, or the first housing and the second housing is a transparent sealant for waterproofing the electrical wire connection when the open end of the first housing engages the open end of the second housing.

BRIEF DESCRIPTION OF THE DRAWINGS

FIG. 3 show a perspective view of an underside of the jaw of FIG. 2;

FIG. 4 also show a perspective view of an underside of the jaw of FIG. 2;

DESCRIPTION OF THE PRIOR ART

U.S. Pat. No. 4,600,261 discloses an apparatus and method for protection of electrical contacts from an adverse environment.

U.S. Pat. No. 5,023,402 discloses a waterproof connector having a rotatable wire connector with a sealant filled housing attaches thereto.

U.S. Pat. No. 5,113,037 discloses a waterproof and fire retardant connector having a rotatable wire connector filled with sealant and having an end cap attached thereto.

U.S. Pat. No. 5,151,239 discloses a solderless twist on wire connector and a method of making a solderless twist on wire junction encapsulating twist on wire connector.

U.S. Pat. No. 5,347,084 discloses a hinged gel-filled environmental sealing device adapted for coaxial cable splices.

U.S. Pat. No. 5,828,005 discloses a gel-filled closure for protecting a connector component between a cable and at least another cable.

U.S. Pat. No. 6,025,559 discloses a twist-on wire connector that includes a multi-piece connector assembly in which a wire or wire bundle is first joined together and subsequently encapsulated into a moisture-resistant sealant.

U.S. Pat. No. 6,051,791 discloses a waterproof wire connector comprising a tubular cap having a tubular shoe telescopically received in the cap.

U.S. Pat. No. 6,958,116 discloses a method and apparatus for cathodic protection of reinforced concrete using discrete nodes in or on the reinforced concrete member to improve performance and service life of the discrete anodes.

U.S. Patent Number RE 37,340 discloses a waterproof and fire retardant connector having a rotatable wire connector filled with sealant and having an end cap attached thereto.

DESCRIPTION OF THE PREFERRED EMBODIMENT

Figure 1:
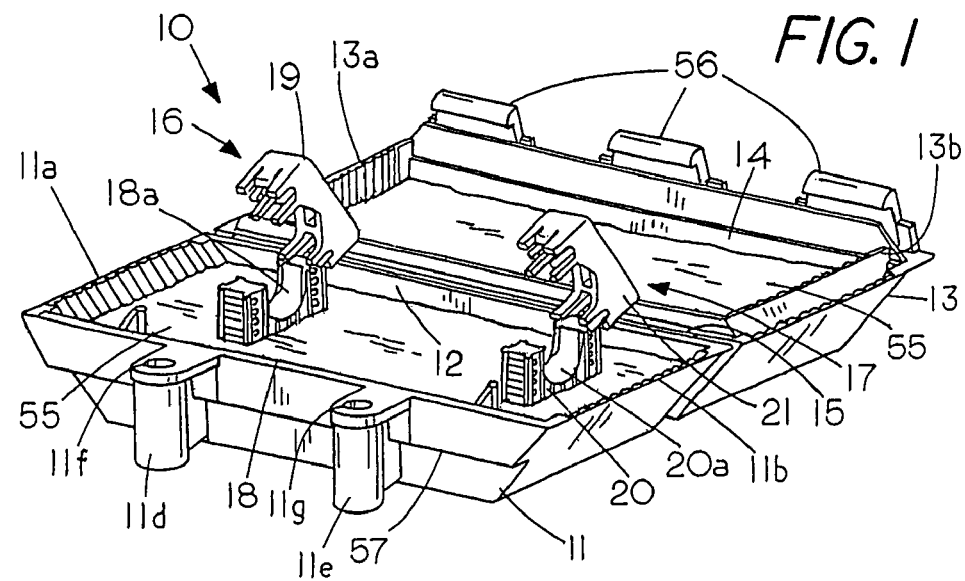
FIG. 1 is a perspective view of the on-the-go sealable wire connector.

FIG. 1 is a perspective view of an open-face electrical connector 10 that permits on-the-go securement and sealability of an electrical junction after an electrical connection has been formed. The open-face wire connector 10, which is a clamshell type wire connector, is shown in a sealant carrying condition. Wire connector 10 includes a first open housing 11 and a second open housing 13. Housings 11 and 13 are formed of an electrical insulating material such as a polymer plastic. First housing 11 includes a first end wall 11a, a second end wall 11b and an open top empty chamber 12 for receiving a sealant 55 and second housing 13 includes a first end wall 13a, a second end wall 13b and an open top chamber 14 for holding a sealant 55. In the embodiment shown a sealant 55 is located in both housing 11 and housing 13 and extends upward to partially fill the compartment therein. Consequently, when the housings 11 and 13 are closed the sealant flows around and encapsulates the electrical junction held between the wire retainers 18 and 20. While sealant is shown in both housings it is within the scope of the invention to have only one of the housings contain the sealant.

In the preferred embodiment a preferred sealant 55 comprises a viscous sealant such as silicone or the like which is retained in the housing if the housings 11 and 13 is tipped during handling. Other types of sealant, such as epoxy sealants, could also be used in the present invention. While the invention is shown with the use of sealant therein it can be appreciated that the open face connector can also be used without sealant.

Open housings 11 and 13 are hinged to each other and form an enclosure when the open housings 11 and 13 are mated to each other. More specifically, housing 13 has a mating shape with housing 11 so that when the open ends of housing 11 and housing 13 are brought into engagement they form an enclosure for supporting an electrical wire branching connection therein. It is noted that the enclosure also functions to confine the sealant therein. Housing 11 includes a set of three snap extensions 56 located on the open end of housings 13 for lockingly engaging an opposing lip 57 located on a ledge of housing 11 to maintain the engagement of housing 11 and housing 13 in a closed condition.

In the embodiment shown housings 11 and 13 are preferably made from a polymer plastic and include a living hinge 15 for pivotally connecting and maintaining the housings 11 and 13 proximate each other when the wire connector 10 is in an open condition. In addition, hinge 15 allows one to rotate second housing 13 one hundred eighty degrees to bring second housing 13 into mated engagement with the housing 11. Located on the front side of housing 11 is a first mounting post 11d having an opening 11f therein and a second mounting post 11e having an opening 11g therein.

Open face connector 10 can be used in various modes. If there is no sealant present in chambers 12 or 14 the connector 10 can be used to form a protective housing around an electrical junction by closing housing 13 on housing 11. On the other hand if a user wants to use a sealant on certain connections but not on other types of connections the user can place the sealant in those open face connectors that require sealant and leave the other connections without sealant.

Referring to first housing 11, first housing 11 includes a first latchable wire retainer 16 and a second latchable wire retainer 17 spaced therefrom with both the wire retainers 16 and 17 openable for laterally inserting a wire therein and subsequently encompassing and securing the wire to the housing by clamping the wire in the wire retainers 16 and 17.

First wire retainer 16 comprises a base member or lower jaw 18 having a wire supporting surface 18a and an adjustable locking cover or upper jaw 19 for clamping around a portion of a wire to secure an electrical wire therein. Similarly, second wire retainer 17 comprises a lower jaw or base member 20 having a wire supporting surface 20a and an adjustable locking upper jaw or cover 21 for clamping around a portion of a wire to secure an electrical wire therein.

In the normal condition second housing 13 is preferably held in an open and extended condition. In the embodiment shown in FIG. 1, hinge 15 includes a bias to hold the second housing 13 in a laterally extended condition from first housing 11 so as to make the latchable wire retainers 16 and 17 readily accessible for supporting the wire thereon.

Figure 1A:
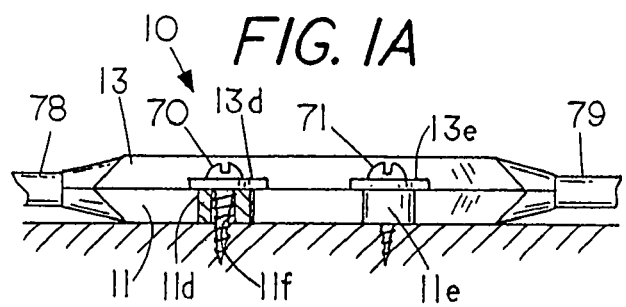
FIG. 1A is a partial front view of the wire connector of FIG. 1 secured to a support surface.
Figure 1B:
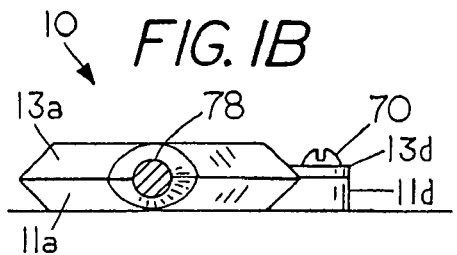
FIG. 1B is an end view of the wire connector of FIG. 1A.

FIG. 1A is a partial front view of the wire connector 10 and FIG. 1B is an end view of the wire connector of FIG. 1A secured to a support surface 9 showing the mounting post 11d (in section) and the mounting post 11e which are integrally part of housing 11. In addition, tabs 13d and 13e which are integrally part of housing 13 extend outward. Tab 13d extends over mounting post 11d to enable a fastener such as a screw 70 to be extended through the tab 13d and the mounting post 11d into the support surface 9. Similarly, Tab 13e extends over mounting post 11e to enable a fastener such as a screw 71 to be extended through the tab 13e and the mounting post 11e into the support surface 9. This provides a two-fold benefit, first one can secure the wire connector 10 in a closed condition, and second one can secure the wire connector to a fixed location. In addition, if desired the mounting posts and tabs can be secured to each other to hold the wire connector 10 in a closed condition without securing the wire connector to a support surface. In the embodiment shown a wire 78 extends from one side of wire connector 10 and a wire 79 extends from the opposite side of the wire connector 10 while the one side of the housing partially nests in the other side to prevent sealant from escaping. That is the edges of one container can extend partially into the other container to inhibit sealant from flowing there past.

Figure 2:
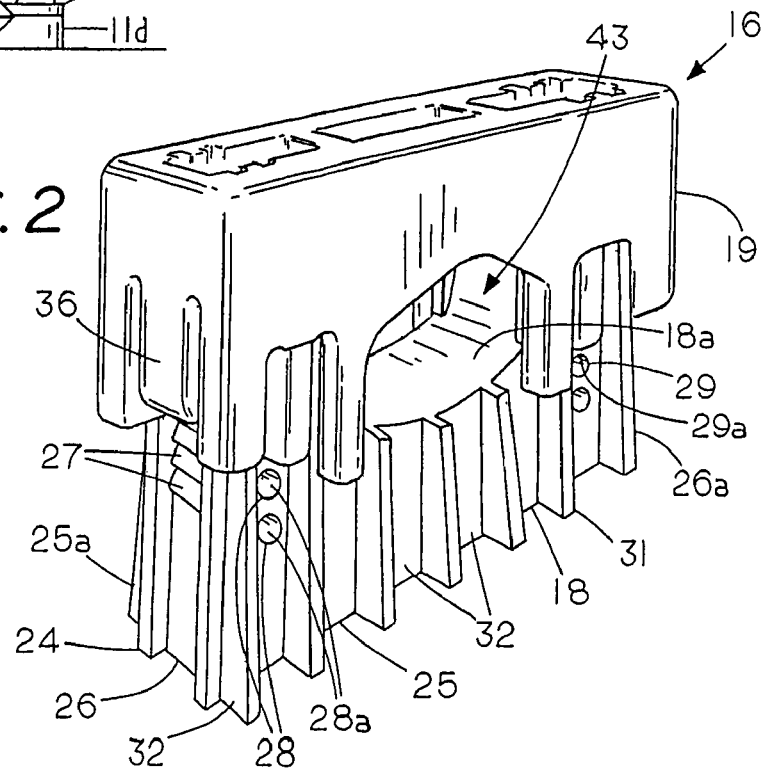
FIG. 2 shown an isolated perspective view of a wire retainer.

FIG. 2 shows an isolated perspective view of latchable wire retainer 16 of FIG. 1. Latchable wire retainer 16 generally comprises two main parts, namely lower jaw 18 and upper jaw 19. Jaw 18 comprises a body 24 having a first side 25, a second side 25a, a first end 26, a second end 26a, and a wire supporting surface 18a. Although the wire-supporting surface can comprise a variety of shapes, in the embodiment of FIG. 2, wire supporting surface 18a comprises a generally semi-circular shape and can function to support wires of varying sizes.

Located on end 26 is a set of end teeth 27 and similarly, located on end 26a is an identical set of teeth (not shown). The set of end teeth are located diametrically opposed to each other on ends 26 and 26a of body 24. Body 24 also includes a first set of holes 28 and a second set of holes 29 extending from the first side 25 to the second side 25a of body 24 with first set of holes 28 shown in the embodiment of FIG. 2 located proximate the first end 26 of body 24 and the second set of holes 29 shown located proximal the second end 26a of body 24. Body 24 also includes a plurality of ribs 31 extending from sides 25 and 25a and ends 26 and 26a with elongated ribs 31 forming a plurality of guide channels 32 therebetween with the ribs enhancing the rigidity and strength of the jaw.

FIG. 3 shows a perspective view of an underside of the one piece jaw 19 of FIG. 2 and FIG. 4 shows a perspective view of the one piece jaw 19 partially in section. Jaw 19 includes a first end 34, a second end 34a, and a wire-engaging surface 35. Extending from first end 34 is a first integral resilient latch 36 having a tooth 36a for lockingly engaging the set of teeth 27 and extending from second end 34a is a second integral resilient latch 37 having a tooth 37a for lockingly engaging a set of teeth (not shown) located on the end 26a of jaw 18.

Jaw 19 also includes a first pair of resilient extensions 38 and 38a and a second pair of resilient extensions 40 and 40a. The first pair of extensions 38 and 38a are shown located proximal the first end 34 of jaw 19 and the second pair of extensions 40, 40a are shown located proximal the second end 34a of jaw 19. Extension 38, having a transversely extending pivot pin 39 and similarly extension 38a having a transversely extending pivot pin 39a. Pivot pins 39 and 39a are diametrically opposed to each other for locking and rotateable engagement with a cylindrical shoulder 28a forming hole 28 (FIG. 2) and for locking and rotateable engagement with a cylindrical shoulder 29a forming hole 29 (FIG. 2) of jaw 18. Similarly, extension 40 includes a pivot pin 41 and extension 40a includes a pivot pin 41a with the pivot pins 40a and 41a positioned diametrically opposed to each other for rotateable locking engagement with the shoulders of holes 28 and 29. Referring back to FIG. 3, it is noted that a feature of the present invention is that extensions 38 and 38a and the extensions 40 and 40a have opposing pins. More specifically, the opposing pins 39 and 39a are mateable to the shoulders surface 28a of the hole 28.

Figure 5:
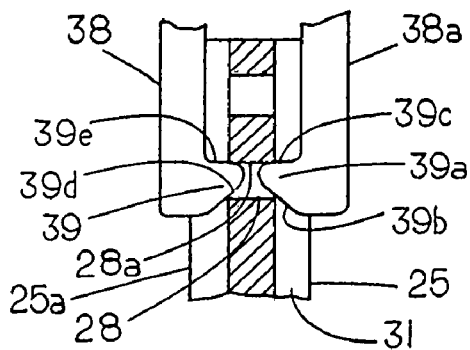
FIG. 5 is a partial cross-sectional end view showing the interaction between the extensions of the upper jaw and the holes in a lower jaw.

FIG. 5 is a partial cross-sectional end view showing the interaction between resilient extension 38 of jaw 19 and one end of shoulder 28a of one of the holes 28 of jaw 18 and extension 38a and an opposite end of shoulder 28a of one of the holes 28 of the jaw. As can be seen when the resilient extensions are in the position shown in FIG. 5 the pins 39 and 39a extend into the hole 28 to engage cylindrical shoulder surface 28a therein.

Pin 39 has a lower angled face 39d, which allows pin 39 to be disengaged as extension 38 is pushed downward. That is, the angled face 39d guides pin 39 transversely outward as a downward force is applied to extension 39. Similarly, pin 39a has a lower angled face 39b, which allows pin 39a to be disengaged as extension 38a is pushed downward. That is the angled face 39b guides pin 39 transversely outward as a downward force is applied to extension 39 and the angled face 39d guides pin 39 transversely outward as the downward force is applied to extension 38.

Figure 5A:
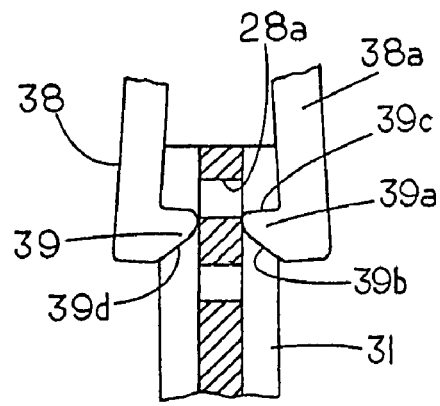
FIG. 5A is a partial cross-sectional end view showing the disengagement between the extensions of the locking cover and the holes of a lower jaw as the upper jaw is pushed into a closed condition.

FIG. 5A shows the pin 39 and the pin 39a moving transversely outward of the retaining shoulder 28a as a downward force is applied to the extensions 38 and 38a through jaw 19. The opposing pins 39 and 39a, which are mounted on resilient extensions 38 and 38a enable one to quickly engage the upper and lower jaw. That is, they prevent upward displacement of upper jaw 19 with respect to lower jaw 18 but not in the downward direction thereby enabling one to snug the upper jaw 19 around any wires located in lower jaw 18. In addition, if only one set of the pivot pins 39 and 39a of upper jaw 19 on the extensions 38 and 38a is engaged at the same time, as illustrated in FIG. 1, it permits rotational engagement between upper jaw 19 and lower jaw 18 to enable jaw 19 to be pivotally opened to permit lateral insertion of a wire between jaw 19 and jaw 18. Jaw 19 can then be pivoted around the wires until the extensions 40 and 40a (FIG. 3) with their respective pins 41 and 41a are engaged with the lower jaw 18. Once in engagement one can push down on the upper jaw 19 and snug the upper jaw 19 around any wires located in the lower jaw 18. In contrast to the angled faces 39b and 39d the upper transverse faces 39c and 39e engage the interior shoulder surface 28a to prevent withdrawal of the pin 39a as shown in FIG. 5.

A reference to FIG. 2 and FIG. 3 shows that jaw 19 further includes a set alignment members 42 for mating engagement with the guide channels 32 of base member 18 to provide for an alignment of jaw 19 to jaw 18.

In the process of securing jaw 19 to jaw 18, the diametrically opposing pins 39, 39a of pair of extensions 38, 38a engage the first slot of set of holes 28 to pivotably attached jaw 19 to jaw 18. Once pivotally attached to jaw 18, jaw 19 is then rotated to mate the alignment members 42 of jaw 19 with the guide channels 32 of jaw 18. The mating of alignment members 42 with the guide channels 32 results in the wire supporting surface 18a of jaw 18 and the wire engaging surface 35 of jaw 19 cooperating to form an opening 43 for receiving a portion of a wire therein.

The diametrically opposing pins 41, 41a of pair of extensions 40, 40a are then mated to a set of holes 29 as shown in FIG. 2. Jaw 19 is then pushed towards jaw 18 to further lock or latch jaw 19 to jaw 18 through the engagement of the tooth of latch 36 of jaw 19 with the set of teeth of jaw 18.

In regards to opening 43, it is noted that the size of opening 43 can be adjusted to accommodate electrical wires of different shapes and sizes. The size of opening 43 is adjusted through the displacement of jaw 19 with respect to jaw 18. The set or desired size of opening 43 is then lockingly maintained by the engagement of pins 39, 39a of extension 38 and pins 41, 41a of extension 40 with respect to the set of holes 28 and 29 of jaw 18 and by the engagement of latches 36 and 37 of jaw 19 with respect to the teeth on lower jaw 18.

Figure 6:
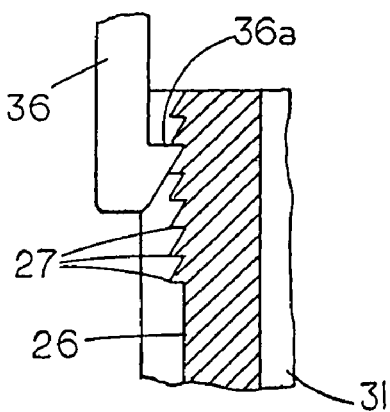
FIG. 6 is a partial cross-sectional side view showing the interaction between a latch of the upper jaw and a set of teeth of the lower jaw.

FIG. 6 is a partial cross-sectional side view showing the interaction between tooth 36a of latch 36 of jaw 19 and the set of teeth 27 of jaw 18 in locking the set size of opening 43.

After a portion of an electrical wire is supported on wire supporting surface 18a, jaw 19 is secured to jaw 18 and the wire engaging surface 35 of jaw 19 is moved towards wire supporting surface 18a thereby changing the size of opening 43. Referring to FIGS. 5 and 6, as jaw 19 is displaced towards jaw 18, the slot of set of holes 28, which pins 39 and 39a lockingly engage changes and the tooth of set of teeth 27, which tooth 36a of latch 36 lockingly engages also changes. Wire engaging surface 35 is moved towards wire supporting surface 18a until wire-engaging surface 35 engages and clamps a portion the electrical wire after which displacement of jaw 19 towards jaw 18 ceases.

Figure 7:
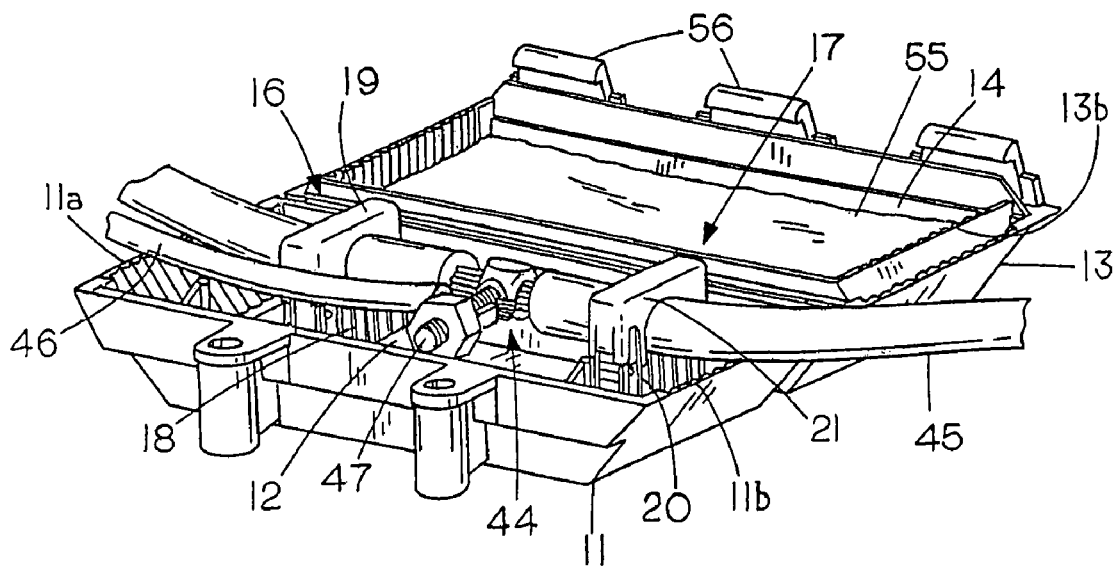
FIG. 7 is a perspective view showing the open-face electrical connector of FIG. 1 supporting an electrical wire branching connection therein.

FIG. 7 is a perspective view showing the open-face electrical connector 10 of FIG. 1 supporting an electrical wire branching connection 44 therein. In the use of the open-face electrical connector 10 as shown in FIG. 7, the electrical wire branching connection 44 is first made between a main electrical wire 45 and a secondary electrical wire 46 through the use of an electrical connection member comprising a split bolt connector 47. It is noted that the electrical connection member that can be used for the present invention is not limited to a split bolt connector and that other types of electrical connection member can be used. A first insulated portion or section of main electrical wire 45 is then supported on jaw 18 of first wire retainer 16 and is lockingly secured thereto by jaw 19. A second insulated portion or section of main electrical wire 45 is then supported on jaw 20 of second wire retainer 17 and is lockingly secured thereto by jaw 21 with the electrical wire branching connection 44 located between first wire retainer 16 and second wire retainer 17.

Although not shown, once electrical wire branching connection 44 is secured in open-face electrical connector 10 between first wire retainer 16 and second wire retainer 17, the open end of first housing 11 is brought into mating engagement with the open end of second housing 13. The engagement of the open end of first housing 11 and the open end of second housing 13 causes the first end wall 11a of the first housing 11 and the first end wall 13a of the second housing 13 cooperate to form a seal around a third insulated portion of main electrical wire 45 and an insulated portion of secondary electrical wire 46. The second end wall 11b of the first housing 11 and the breakable end wall 13b of the second housing 13 also cooperate to form a seal around an insulated portion of main electrical wire 45 to confine the electrical wire branching connection 44 within the enclosure formed by the housings 11 and 13.

To provide for waterproof protection, the presence of a sufficient amount of a viscous sealant 55 in second housing 13 allows one to bring the second housing 13 into engagement and cause the sealant 55 in the housing 11 and 13 to flow around the split bolt connector 47 and the exposed portions of wires 45 and 46 to form a waterproof electrical wire branching connection 44 therein.

It is noted that the seals formed around wires 45 and 46 by end walls 11a, 11b, 13a, and 13b can be from a resilient or flexible nature of walls 11a, 11b, 13a, and 13b, or from the form-fitting knock out or by cutting a recess in walls 11a, 11b, 13a, and 13b, or by the combination thereof.

A further feature of the invention is that the retainers 19 and 20 provide a mechanical stop for the split bolt connector 44 that prevents the wires from being accidentally pulled free of the assembled wire connector 10.

Figure 8:
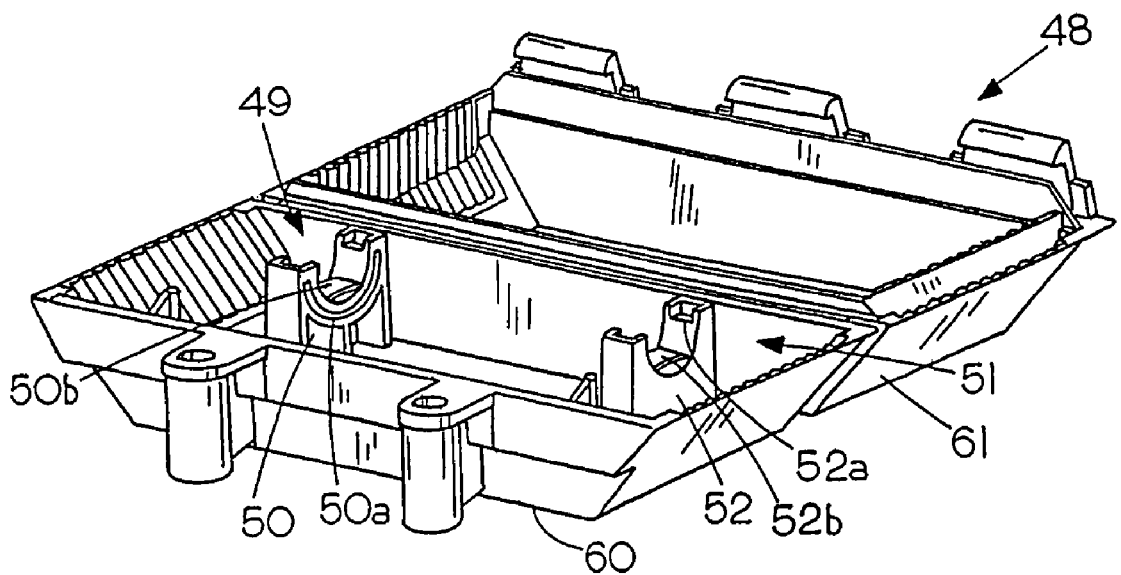
FIG. 8 is perspective views showing an embodiment of an open-face electrical connector similar to the on-the-go sealable wire connector of FIG. 1.
Figure 9:
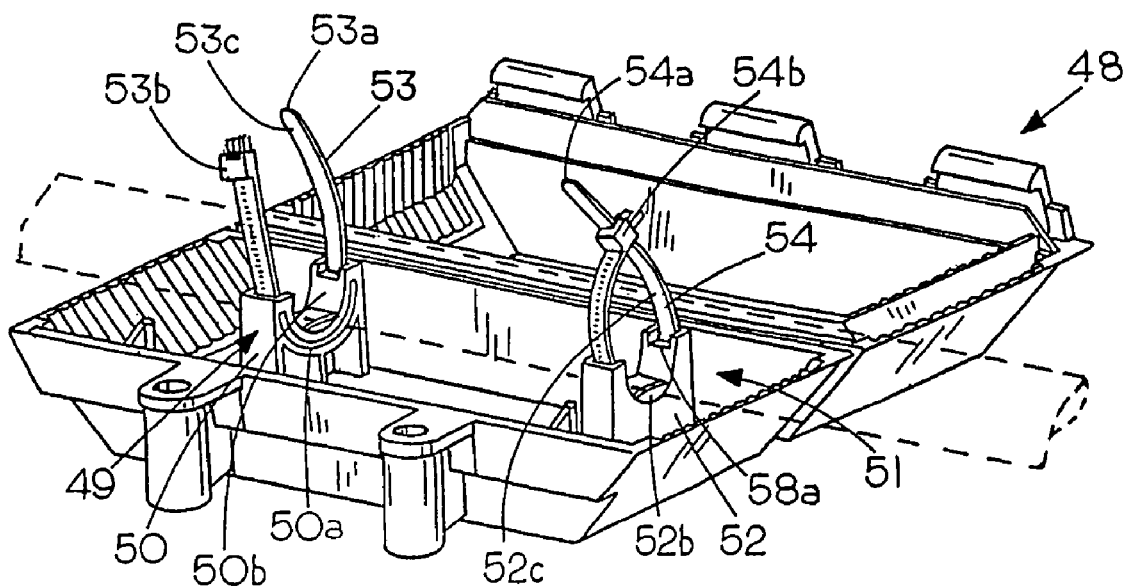
FIG. 9 is perspective views showing the open-face electrical connector of FIG. 8 having wire fastener members comprising cable ties.

FIGS. 8 and 9 are perspective views showing an alternative embodiment of an open-face electrical connector 48 having a first housing 60 and a second housing 61 that permits on-the-go securement and sealability of an electrical junction in the joined housings after an electrical connection has been formed. Open-face electrical connector 48 is similar to the open-face electrical connector 10 of FIG. 1 with open-face electrical connector 48 including a first wire retainer 49 comprising a first lower rigid jaw 50 having a first wire supporting surface 50 and a cable tie supporting channel 50a located beneath wire supporting surface 50 and an upper jaw comprising a flexible cable-tie 53 having a wire engaging surface 53c with the cable-tie threadable through cable tie channel 50a to form a latchable upper jaw 53.

Similarly, housing 60 including a second wire retainer 51 comprising a first lower rigid jaw 52 having a first wire supporting surface 52b and a cable tie supporting channel 52a located beneath wire supporting surface 52b and an upper flexible jaw comprising a flexible cable-tie 54 having a wire engaging surface 52c with the cable tie 53 threadable through cable tie channel 52a to form a latchable upper jaw 54. Cable ties are well known and generally comprises an elongated flexible band with a set of teeth thereon and a penetrateable head having teeth therein so that when the flexible band is extended through the head the teeth on the band slide past each other in one direction but engage each other if moved in opposite direction to prevent withdrawal of the band from the head.

In use of open-face electrical connector 48, a first portion of an electrical wire, shown in phantom, is supported on the wire supporting surface 50b of lower jaw or jaws 50 and a second portion of an electrical wire, shown in phantom, is supported on the wire supporting surface 52b of lower jaw or jaws 52. To latch a wire therein a free end 53a of cable-tie 53, which forms a first upper jaw, is extended through a locking end 53b of cable-tie 53 and the free end 54a of cable-tie 54, which forms a second upper jaw, is extended through a locking end 54b of cable-tie 54. The free end 53a of cable-tie 53 and the free end 54a of cable-tie 54 are then pulled to lockingly secure the first portion of the electrical wire to jaw 50 and the second portion of the electrical wire to jaw 52.

The electrical connector 10 and electrical connector 48 both allow one to clamp wires of different sizes therein since both allow one to adjust the upper jaw of the latchable retainers to accommodate wire or wires of different sizes.

Figure 10:
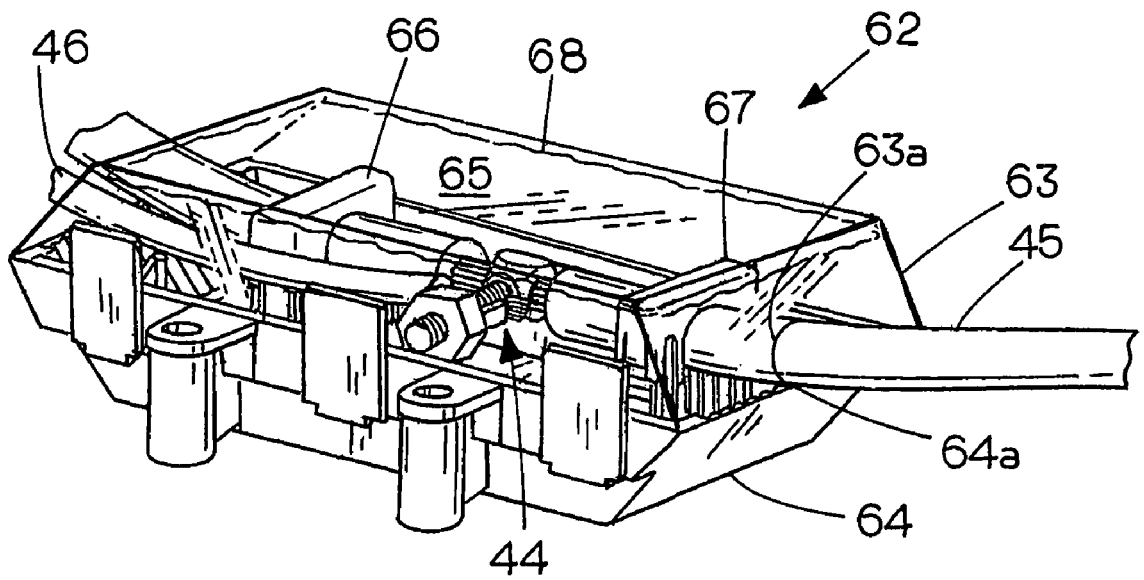
FIG. 10 is a perspective view showing an alternative embodiment of a see-through electrical connector having a transparent housing.
Figure 11:
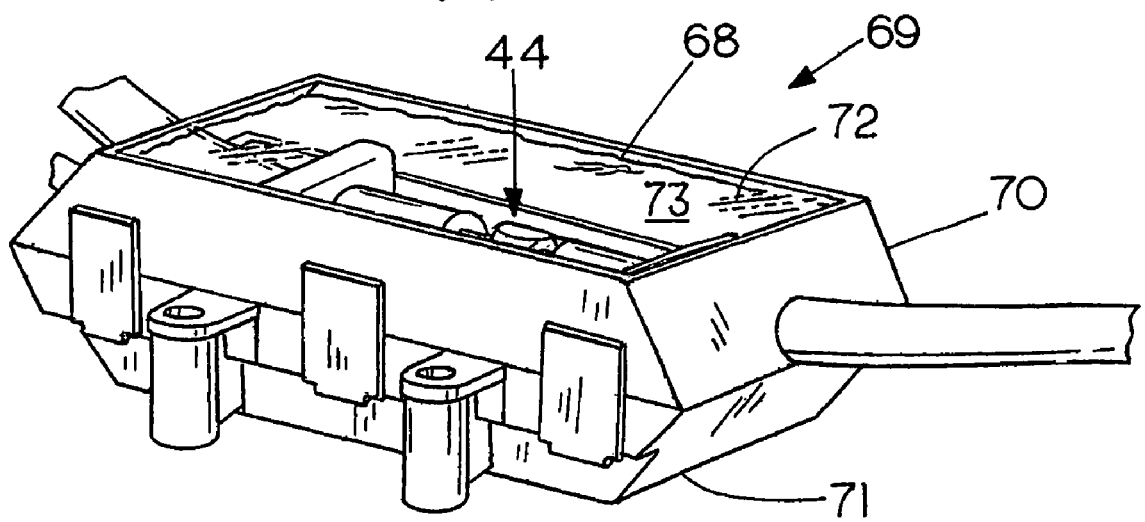
FIG. 11 is a perspective view showing an alternative embodiment of a see-through electrical connector having a housing containing a viewing window.

FIGS. 10 and 11 are perspective views each showing alternative embodiments of a see-through electrical connectors 62 and 69 similar to the open-face electrical connector 10 of FIG. 1. See-through electrical connectors 62 and 69 are each shown supporting electrical wire branching connection 44 therein in a closed condition. Referring to FIG. 10, see-through electrical connector 62 comprises a transparent first housing 63 having a chamber therein and a second housing 64 having chamber therein. The second housing 64 includes an open end 64a mateable with an open end 63a of the transparent first housing 63 to form an enclosure 65 for supporting an electrical wire branching connection 44 therein. Located within enclosure 65 is an electrical wire securing and supporting member for supporting for supporting electrical wire branching connection 44 in enclosure 65. In the embodiment FIG. 10, the electrical wire securing and supporting member comprises a first latchable wire retainer 66 and a second latchable wire retainer 67 identical to latchable wire retainers 16 and 17 of FIGS. 1 and 7.

In regards to first housing 63 and second housing 64, first housing 63 and second housing 64 preferably are both formed from an electrically insulating material wherein either the first housing 63 or the second housing 64 comprises a transparent member to allow for the viewing of electrical wire branching connection 44 in the enclosure 65 when see-through electrical connectors 62 is in the closed condition. However, in alternative embodiments the first housing 63 and the second housing 64 each comprises a transparent electrical insulating material such as a transparent polymer plastic or a transparent polypropylene to allow for the viewing of electrical wire branching connection 44 in the enclosure 65 at all angles when see-through electrical connectors 62 is in the closed condition.

See-through electrical connector 62 also includes a transparent sealant 68 located in either the transparent first housing 63, the second housing 64, or both the first housing 63 and the second housing 64 with transparent sealant 68 functioning to waterproof the electrical wire branching connection 44 located within enclosure 65 when the open end 63a of the first housing 63 engages the open end 64a of the second housing 64. An example of the transparent sealant that may be used include a product called QGel-317, which is a silicone elastomer manufactured and sold by Quantum Silicones, Inc., a corporation located in Richmond, Va. 23237.

Referring to FIG. 10, see-through electrical connector 69 is almost identical to see-through electrical connector 62 of FIG. 9. However, instead of providing for the transparent first housing 63 and the second housing 64 as shown in the embodiment of FIG. 9, open-face electrical connector 69 comprises a first housing 70 and a second housing 71 wherein either the first housing 70, second housing 71 or both the first housing 70 and the second housing 71 include a viewing window 72 located thereon to allow for the viewing of electrical wire branching connection 44 in the enclosure 73 when see-through electrical connectors 69 is in the closed condition.

The present invention includes a method of forming a branch attachment comprising the steps of (1) forming a first housing 11 having a chamber 12 containing a first wire retainer 16 and a second wire retainer 17; (2) forming a second housing 13 having a chamber 14 therein; (3) placing a sealant 55 in at least one of the housings; (4) placing a wire 45 of an electrical wire branching connection 44 on a wire supporting surface 18a of the first wire retainer 16 and a wire supporting surface 20a of the second wire retainer 17; (5) securing the wire 45 of the electrical wire branching connection 44 to the first wire retainer 116 and the second wire retainer 17; and (6) placing an open end of the first housing and an open end of the second housing in engagement to cause the sealant in the housing to flow around an electrical junction of the electrical wire branching connection 44. The aforementioned method also can include the step of placing a sealant 55 in the first housing 11.

The present invention also includes a method of forming a branch attachment comprising the steps of (1) forming a first housing 63, 70 having a chamber containing an electrical wire securing and supporting member 66; (2) forming a second housing 64, 71 having a chamber therein; (3) forming a viewing window 72 on either the first housing 63, 70 or the second housing 64, 71; (4) placing a transparent sealant 68 in either the first housing 63, 70 or the second housing 64, 71; (5) securing an electrical wire 46 to the electrical wire securing and supporting member 66; (6) placing an open end 63a of the first housing 63 and an open end 64a of the second housing 64 in engagement to bring the first housing 63 and the second housings 64 into a closed condition to cause the transparent sealant 68 to flow around an electrical junction of an electrical wire connection 44; and (7) viewing the electrical wire connection 44 with the first housing 63, 70 and the second housing 64, 71 in the closed condition to verify a proper electrical wire connection 44.

The above method may further include the steps of (8) placing the transparent sealant 68 in both the first housing 63, 70 and the second housing 64, 71; (9) forming a first housing 63, 70 having a chamber containing a wire retainer 66 therein; and (10) viewing the electrical wire connection 44 with the first housing 63, 70 and the second housing 64, 71 in the closed condition to check for corrosion.

The invention claimed is:

1. A see-through electrical connector comprising:
a first housing having a chamber therein;
a second housing having chamber therein, the second housing mateable with the first housing to form an enclosure for supporting an electrical wire connection therein;
a window located on either the first housing or the second housing for viewing the electrical wire connection in the enclosure; and
an electrical wire securing and supporting member located in the enclosure.

2. The see-through electrical connector of claim 1 wherein the first housing and the second housing comprise an electrically insulating material.

3. The see-through electrical connector of claim 1 wherein either the first housing or the second housing comprises a transparent member for viewing the electrical wire connection in the enclosure.

4. The see-through electrical connector of claim 1 wherein the first housing and the second housing each comprises a transparent material for viewing the electrical wire connection in the enclosure.

5. The see-through electrical connector of claim 1 wherein the window comprises a transparent polypropylene.

6. The see-through electrical connector of claim 1 including a transparent sealant located in either the first housing or the second housing, the transparent sealant waterproofing the electrical wire connection when the open end of the first housing engages the open end of the second housing.

7. The see-through electrical connector of claim 6 wherein the transparent sealant comprises a transparent silicone elastomer.

8. The see-through electrical connector of claim 1 wherein the electrical wire securing and supporting member comprises a latchable wire retainer located in the enclosure, the latchable wire retainer having a first jaw with a wire support surface and a second jaw with a wire support surface with the latchable wire retainer having an open condition for laterally inserting a wire between the first jaw and the second jaw and then bringing the first jaw and the second jaw into clamping engagement around a peripheral wire surface by bringing the first jaw toward the second jaw.

9. The see-through electrical connector of claim 8 wherein the second jaw of the latchable wire retainer comprises an adjustable wire fastener for securing a portion of the electrical wire to the wire supporting surface of the first jaw.

10. A see-through electrical connector comprising:
a transparent first housing having a chamber therein;
a second housing having chamber therein, the second housing mateable with the transparent first housing to form an enclosure for supporting an electrical wire connection therein;
means for securing and supporting the electrical wire connection within the enclosure; and
a transparent sealant.

11. The see-through electrical connector of claim 10 wherein the second housing comprises a transparent second housing.

12. The see-through electrical connector of claim 11 wherein the transparent sealant comprises a transparent silicone elastomer.

13. A method of forming a branch attachment comprising the steps of:
forming a first housing having a chamber containing an electrical wire securing and supporting member;
forming a second housing having a chamber therein;
forming a viewing window on either the first housing or the second housing;
placing a transparent sealant in either the first housing or the second housing;
securing an electrical wire to the electrical wire securing and supporting member;
placing the first housing and the second housing in engagement to bring the first housing and the second housings into a closed condition to cause the transparent sealant to flow around an electrical junction of an electrical wire connection; and viewing the electrical wire connection with the first housing and the second housing in the closed condition to verify a proper electrical wire connection.

14. The method of claim 13 including the step of placing the transparent sealant in both the first housing and the second housing.

15. The method of claim 13 wherein the step of forming the first housing having the chamber containing the electrical wire securing and supporting member comprises forming a first housing having a chamber containing a first wire retainer therein.

16. The method of claim 13 including the step of viewing the electrical wire connection with the first housing and the second housing in the closed condition to check for corrosion.

* * * * *